Patented Oct. 8, 1929

1,731,162

UNITED STATES PATENT OFFICE

WILLIAM E. FICKLEN, OF WASHINGTON, DISTRICT OF COLUMBIA

METHOD OF WATERPROOFING

No Drawing.    Application filed January 29, 1926.   Serial No. 84,762.

This invention relates to waterproofing cellars, foundations, walls, and the like, and has for its primary object to waterproof walls, floors and the like from the inside, and it is applicable to walls and the like when originally built, or afterwards, to keep out the moisture.

I have found from long experience in this line that in order to properly insure a wall, floor, foundation, or the like against ingress of moisture an interior lining wall heavy enough to counterbalance in weight the water pressure from the outside is necessary. Herein lies the value of my present improvement.

The method herein disclosed also embraces waterproofing concrete integrally, such as walls, floors, foundations, swimming pools, fuel pits, mortars for plastering and stucco work and other structures wherein Portland cement is used.

The concrete in all cases where there is water pressure is mixed approximately in the proportion of 1 part cement, 2 parts sand, two and a half parts of fine gravel or at least a rich mixture. If it is a topping only, the gravel is omitted. And to this concrete is added a mixture of paraffine oil, water, and enough calcium chloride to equal from 4% to 7½% solution. This paraffine oil or mineral oils (sometimes I use refuse or crank case oil, which is cheap) is put in. It forms a waterproofing and dust proofing element and in combination with the calcium chloride transforms the concrete into a tougher and waterproof product.

I sometimes add to the concrete mixture 5% to 11% of hydrated lime. This mixture and compound blockades and forms a muck or flux that makes the concrete a water-repelling structure. Oil, of course, is a dust proofing and waterproofing element, although I sometimes use linseed oil or china wood oil for the same purpose, but all of said oils retard and if used in large volume, prevents the setting of the Portland cement. But, the calcium chloride or soluble salts overcomes this retardation and accelerates the setting and strengthens the concrete. This combination of calcium chloride and oils makes the cement better to work under a trowel, and creates a fatty substance and makes the concrete more fatty and dense without detracting from its strength.

I find it a great benefit and assistance in cold weather as the oil by itself almost prevents the setting and does not prevent the water going through before the concrete has set. I have found this method very desirable and useful in working against tides as the calcium chloride may be increased to make the concrete set before the tides return. I also use this material in relining walls.

The method of waterproofing cellars through the wall of which the water is seeping, allows and provides for removing the water from the cellar by buckets, pails, and by sump pits or in any of the usual ways. And then if the floor is leaky it is roughened, cleaned and sowed throughout with dry Portland cement. I have discovered that this method of sowing and socking handfuls of dry cement and slapping up a concrete waterproof wall or floor requires skill and fast work, and an absolute knowledge of a high order that is to work in water and counterbalance floors and walls of sufficient weight to stand off water pressure. In bad cases sometimes I weigh down in spots, floors over springs while the cement composition is setting hard. Where springs are coming in, sometimes I lay my floor under water, allowing the water itself to act as a counterbalance weight while the cement composition is hardening and then pump out the water, and then put up the walls of sufficient height and weight to stand off the water pressure. If the water is pouring through strong at any given point or several places, then the said holes are packed with dry cement. Then the concrete topping or floor is laid or spread over the whole area.

I sometimes put in reinforcing rods to strengthen and to help withstand the water pressure and to take care of expansion and contraction. And, if the leaks are not entirely stopped, the process is repeated with an additional topping and sometimes a third time, and troweled down tight.

In case of old walls, I clean them and if necessary roughen them. They may be stone, brick, or concrete of any type. I roughen especially the lower portion that joins the floor and strew or scatter pure cement along the bottom at the edge of the wall and put up a form about six to seven inches wide and a little wider if the water pressure is very strong to a height of a distance that will bring it above where the water is pouring in. I also put in reinforcing rods to take care of the future expansion and contraction as excessive heat might crack the structure. Then I start to pour in my concrete of the above mixture, and the holes where the water is pouring in are socked with pure cement or otherwise coated and the wall where the water is pouring in is often sowed with dry cement or brushed with liquid cement compound so as to bond it with the old wall and to aid and accelerate the setting and blockade the incoming water temporarily, and I carry the new waterproof structure to the height above where the substantial leaks are coming in. Where the whole cellar leaks, I first lay the floor, then the walls resting on the floor forms a lever and counterbalances the water pressure, the reinforcement going under the wall.

I have found that the various thin plaster coats, no matter of what composed, are not sufficient in strength to stand off the pressure of the water so that the wall is erected about eighteen inches to two feet high, in any event, so that the combination with the weight of the wall and the water proofing, the water stops where it is coming in. Thus the pressure from the outside is offset or counterbalanced by the weight or pressure of the wall from the inside. Thus, in the weak structure, I do not have two walls, as many others erect when the envelope system and other coatings are used. Several coatings or separate structures while they often stick do not permanently stick as a whole and do not furnish the binding effect and strength like mine, which becomes unitary with the old structure Following out this method, I also coat walls and floors and other structures with a liquid grout or brush coats for walls, floors, or structures which are leaking but where the pressure is not so great. In other words, I use it for damp-proofing either inside or outside. In this case I use pure cement, either white or ordinary Portland cement and 1½ shovels of lime to each bag of cement, and approximately 6% in weight and measure of the above named oils, either mineral, china wood, or linseed. I also add my equal quota of calcium chloride or other soluble salts which is about 5%. Sometimes I use instead of calcium chloride magnesium silicate of soda, but this has to be carefully used, as it makes a flash setting. In this mixture I add water sufficiently to mix the cement and lime and chemicals to a consistency of thick paste or paint and can spray the mixture or put it on with a brush, or flip it on like dash stucco is put on. I usually put on two coats and sometimes three, according to the results I want to achieve.

The paraffine oils are usually about from 2% to 33% paraffine, but I have had good results with refuse oil, such as old crank case oil, which is very cheap, and is often thrown away. This structure and process I found very popular with the owners. As if applied in the cellar it often resembles a light paint coat of white wash, making the cellar light, whereas the various asphalt coats leaves the cellar dark. It is superior to plaster coating because the plaster coating costs more and when applied on the inside it usually cracks and becomes shell-like and in five or ten per cent of the work and sometimes at least half of it, in six months, becomes defective. Whereas these heavy brush coats of this character never crack and always adhere tightly.

I have found that it is almost impossible to get the best mechanics and with the greatest care to make a 100% job of waterproofing. The wall work with this brush coating is absolutely sufficient if applied even by laborers. The oil toughens and waterproofs and retards the setting and the calcium chloride or other soluble salts while aiding the waterproofing overcomes the retardation and the two together with the lime and the cement saponifies, and in combination forms a new compound.

This mixture, also, can be used, as will be readily seen, in stucco and cement plaster as well as other structures and even in light colored coats it may be used as some of the oils may be chosen such as straw colored, which do not affect the color of the white cement and lime.

Also, it can be used for parging walls, as it is less likely to crack.

I have found that it is hard to get oil to mix thoroughly with concrete but the calcium chloride and the pine tar oil in the saponification do amalgamate, and its uniform mixture for swimming pools and such like structures is especially valuable. By laying the floor first and then using the heavy walls as a counterbalance to create great pressure to hold the water in and out, the pool does not have to be poured at once, which is often almost impossible and costs more in labor.

In using the mixture for waterproofing and dust proofing floors, it may be used only in the top coating and the lime may be eliminated if desired. In manufacturing my liquid for sale in barrels or other containers, I found out that the oil and the calcium chloride, which also has a large percentage of water in it, do not amalgamate or emulsify and that in transit, after being manufactured, will separate, and I found out after long experimenting that if I added a small portion of pine tar oil which suspends the water in the oil I overcome this difficulty, and they remain mixed so that if the barrel or other container is shaken, the mixture is then complete and a satisfactory compound results.

I have found out that in exterior coatings where paint or asphalt are used that the sun and elements will dissolve it and evaporation of the oils and dissolution takes place. But in this integral mixture the oils cannot evaporate even though they are thin coatings, as they are sealed in. Of course, my brush coats can be put on over asphalt coats or the like to maintain and preserve them and to prevent their dissolution.

It is to be understood that this waterproofing compound and method require Portland cement. And in floors or other reinforced structures to prevent the reinforcements being rusted by the calcium chloride or other soluble salts the oil in combination overcomes this tendency if indeed any should take place in any of the five or eight per cent of calcium chloride or other soluble salt combinations.

Where, in the present instance, I refer to dousing, sowing or socking I have reference to the sudden thrusting of the cement or other materials into the water, a term in common usage in the cement and concrete art.

From the foregoing it will be readily seen that I have conceived of and perfected an improved compound and method of using the same, and it will be readily seen that my compound toughens the cement and waterproofs and makes it less liable to crack or flake, positively excludes the water or moisture and dust proofs floors. I can build a cellar floor or wall in water without any drainage while the cement is setting and in like manner I can build oil pits for fuel, swimming pools, or waterproof cellars, walls, and other structures.

In view of my invention and disclosure variations and modifications to meet individual whim or particular need will doubtless become evident to others skilled in the art, to obtain part or all of the benefits of my invention, without copying the same in every particular as herein disclosed, and I therefore claim all such in so far as they fall within the reasonable spirit and scope of my invention.

The term "wall" is used herein to define not only vertical structures, but floors, ceilings, and the like as my method is applicable to all such structures.

What I claim is:—

1. In the method of waterproofing concrete walls, the step which consists in sowing and socking dry portland cement in the leaky spots and covering the wall with a coating sufficiently thick so that the weight thereof will counterbalance the pressure from the outside while the cement is setting.

2. The method of waterproofing a wall while the moisture or water is coming through the same, which consists in applying an interior lining thereto and then applying material to effect the counterbalancing of the water pressure thereupon from the outside.

3. The method of waterproofing the inner face of a wall while water is coming through the same from the outside, which consists in applying dry cement to the leaky spots from the inside to retard the inflow of the water and covering the same with a relatively thick water-repelling composition in sufficient quantity and sufficiently heavy to resist and counterbalance the water pressure thereupon.

In testimony whereof I affix my signature.

WILLIAM E. FICKLEN.